(12) United States Patent
Lin et al.

(10) Patent No.: US 11,283,652 B2
(45) Date of Patent: Mar. 22, 2022

(54) COMMUNICATION SYSTEM AND METHOD

(71) Applicant: NATIONAL TAIWAN UNIVERSITY, Taipei (TW)

(72) Inventors: Mao-Chao Lin, Taipei (TW); Yung-Tsao Hsu, Taipei (TW)

(73) Assignee: NATIONAL TAIWAN UNIVERSITY, Taipei (TW)

( * ) Notice: Subject to any disclaimer, the term of this patent is extended or adjusted under 35 U.S.C. 154(b) by 59 days.

(21) Appl. No.: 16/867,193

(22) Filed: May 5, 2020

(65) Prior Publication Data

US 2020/0358638 A1 Nov. 12, 2020

Related U.S. Application Data

(60) Provisional application No. 62/844,745, filed on May 8, 2019.

(51) Int. Cl.
  *H04W 4/00* (2018.01)
  *H04L 25/02* (2006.01)
  *H04L 27/20* (2006.01)

(52) U.S. Cl.
  CPC .......... *H04L 25/024* (2013.01); *H04L 27/20* (2013.01)

(58) Field of Classification Search
  None
  See application file for complete search history.

(56) References Cited

U.S. PATENT DOCUMENTS

| | | | | |
|---|---|---|---|---|
| 2010/0322357 | A1* | 12/2010 | Krasny | H04L 25/024 375/341 |
| 2012/0115470 | A1* | 5/2012 | Zhuang | H04L 25/024 455/434 |
| 2012/0327991 | A1* | 12/2012 | Hrycak | H04L 27/2647 375/224 |
| 2015/0078494 | A1* | 3/2015 | Talvitie | H04L 25/024 375/346 |

(Continued)

FOREIGN PATENT DOCUMENTS

| | | |
|---|---|---|
| TW | I606743 B | 11/2017 |
| TW | I618372 B | 3/2018 |
| TW | I628969 B | 7/2018 |

(Continued)

*Primary Examiner* — Clemence S Han
(74) *Attorney, Agent, or Firm* — Lin & Associates Intellectual Property, Inc.

(57) ABSTRACT

A communication system and method is disclosed, applicable to the mobile communication using pilot-free channel estimation. In the uplink multiple access, the present invention utilizes the gain division multiple access (GDMA) technology to allow multiple users to share the same resource by utilizing the knowledge of different channel coefficients (channel gains) to distinguish signals transmitted by different users when the transmissions are over different and independent fading channels. Without using pilot signals for channel estimation, the present invention uses the clustering algorithm and the geometrical configuration of the superimposed signals for the superimposed signal sequence received by the base station to implement the estimation of channel gains corresponding to multiple users, and, according to the estimated channel gains, the GDMA technology is utilized to recover the original message transmitted by each user.

12 Claims, 12 Drawing Sheets

(56) References Cited

U.S. PATENT DOCUMENTS

2017/0373772 A1\* 12/2017 Gao ................ H04W 52/00
2021/0027462 A1\* 1/2021 Bredno ............. G06K 9/0014

FOREIGN PATENT DOCUMENTS

| TW | I648997 B | 1/2019 |
| TW | I652922 B | 3/2019 |
| TW | I678113 B | 11/2019 |
| TW | I678127 B | 11/2019 |

\* cited by examiner

| X1 | X2 | S[/] |
|----|----|------|
| 1  | 1  | h1+h2 |
| 1  | -1 | h1-h2 |
| -1 | 1  | -h1+h2 |
| -1 | -1 | -h1-h2 |

FIG. 5

| X1 | X2 | X3 | S[/] |
|---|---|---|---|
| 1 | 1 | 1 | h1+h2+h3 |
| 1 | 1 | -1 | h1+h2-h3 |
| 1 | -1 | 1 | h1-h2+h3 |
| 1 | -1 | -1 | h1-h2-h3 |
| -1 | 1 | 1 | -h1+h2+h3 |
| -1 | 1 | -1 | -h1+h2-h3 |
| -1 | -1 | 1 | -h1-h2+h3 |
| -1 | -1 | -1 | -h1-h2-h3 |

FIG. 9

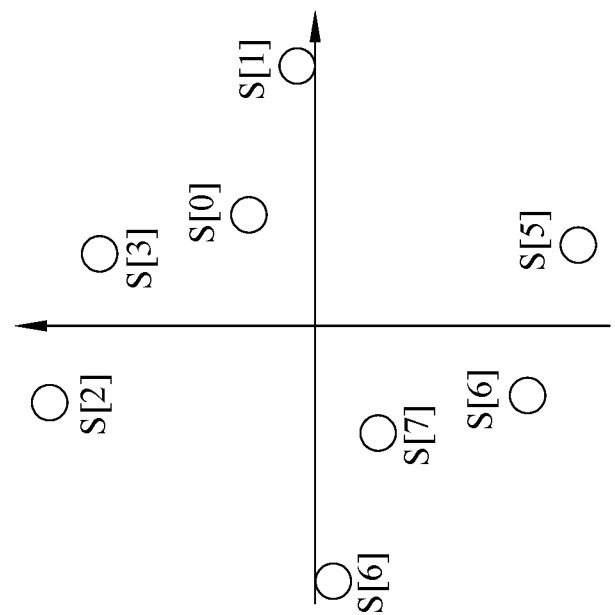
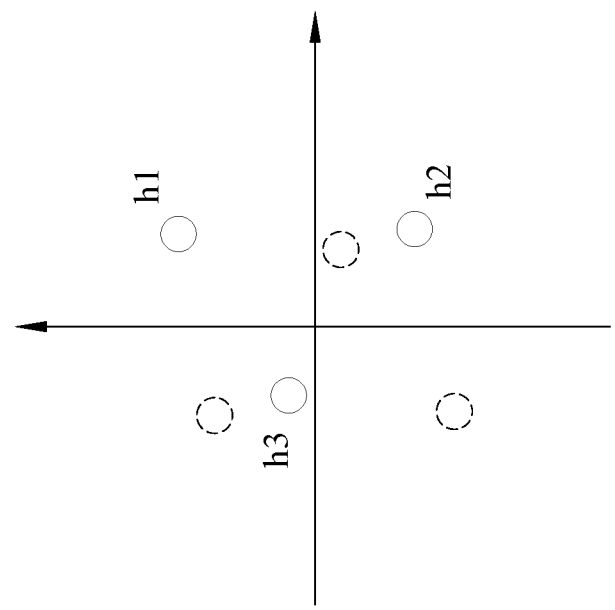
FIG. 10b
FIG. 10a

COMMUNICATION SYSTEM AND METHOD

CROSS-REFERENCE TO RELATED APPLICATION

This application claims the priority of U.S. provisional application No. 62/844,745, filed on May 8, 2019, which is incorporated herewith by reference.

BACKGROUND OF THE INVENTION

1. Field of the Invention

The present invention generally relates to a communication system and method, and in particular, to a communication system and method for uplink multiple access using pilot-free channel estimation.

2. The Prior Arts

The gain division multiple access (GDMA) technology is an essential part of the present communication system. In the present communication technology, the GDMA technology allows multiple users to share the same resource and to simultaneously transmit data, but, however, the data transmission process requires prior coordination for obtaining channel information.

Taiwanese patent No. I606743 titled "Method of multi-user superposition transmission and base station using the same" disclosed a method of multi-user superposition transmission (MUST) method and a base station using the same method. The method would include not limited to: determining a first bit stream to be transmitted; encoding the first bit stream to generate an encoded first bit stream which has a plurality of binary levels per symbol; determining a first encoding rate for each of the binary levels of the encoded first bit stream, wherein at least two of the levels of the encoded first bit stream have a different code rate; and attaching a first plurality of redundancy bits based on the first encoding rate.

Taiwanese patent No. I628969 B titled "JOINT USER CLUSTERING AND POWER ALLOCATION METHOD AND BASE STATION USING THE SAME" provided a joint user clustering and power allocation method and a base station using the same. They are applicable to cooperative non-orthogonal multiple access (NOMA) systems. The method includes: sorting K users according to the K channel gains between the base station and the K users, and then establishing a strong user candidate group of K/2 users and a weak user candidate group of K/2 users; paring each of the users in the strong user candidate group with each of the users in the weak user candidate group so as to partition the K users into K/2 clusters, where the power allocation coefficients for each pair of users are also calculated during the paring process; and transmitting signals to the K users based on the calculated power allocation coefficients of the K/2 clusters.

Taiwanese patent No. I648997 titled "Joint power allocation, pre-coding. and decoding method and base station thereof" provided a joint power allocation, pre-coding, and decoding method and a base station thereof. They are applicable to multiple-input multiple-output non-orthogonal multiple access (MIMO-NOMA) systems. The method includes: (1) decomposing the pre-coder for each cluster into a first pre-coder and a second precoder; (2) obtaining the mean-squared error (MSE) functions of the decoded signals for all user devices in each cluster; (3) calculating the power allocation factors for each cluster in the case of minimizing the maximum of all the MSE functions in each cluster; and (4) obtaining the second precoder and the decoder for each cluster in the case of minimizing the sum of MSE functions of the decoded signals for all user devices in all clusters under a total power constraint according to the power allocation factors.

Taiwanese patent No. I652922 titled "Transmitter for non-orthogonal multiple access communication system and transmitting method thereof" disclosed a transmitting method of a transmitter for non-orthogonal multiple access communication system, comprising: storing rules for calculating transmission rate combinations for simultaneously transmitting a first and a second application data; receiving a transmission grant for transmitting the first application data from a receiver; determining whether to transmit the second application data simultaneously; if yes, calculating multiple transmission rate combinations for simultaneously transmitting the first and the second application data to calculate a transmission rate combination table, or generating the transmission rate combination table according to a previously stored transmission rate combination table; selecting a transmission rate combination from the transmission rate combinations in the transmission rate combination table based on a transmission rate requirement of the second application data; and transmitting the first and the second application data simultaneously based on the selected transmission rate combination.

Taiwanese patent No. I678127 titled "Methods for wireless communications" disclosed various novel concepts and schemes pertaining to non-orthogonal multiple access for wireless communications. A group orthogonal coded access (GOCA) scheme is introduced to reduce multi-user interference (MUI) and improve performance. A repetition division multiple access (RDMA) scheme is introduced to differentiate user equipment (UEs) by different repetition patterns. A low-density spreading (LDS) scheme is introduced to reduce MUI and improve performance.

Taiwanese patent No. I678113 titled "Method of receiving data, method of transmitting data and user equipment" provided a method of receiving or transmitting data by a UE or by a base station which operates under a NOMA scheme, a UE using the same method, and a base station using the same method. According to one of the exemplary embodiments, the method would include not limited to: receiving, within a same physical resource, a combined signal having a first signal and a second signal that are superimposed on each other; applying a phase rotation information for the first signal and the second signal; removing, from the combined signal, the second signal based on the phase rotation information; and decoding the first signal from the combined signal.

Taiwanese patent No. I618372 titled "Multiple access system for multiple users to use the same signature" disclosed a multiple access communication system in which receiving devices equipped with a method of differentiating signals from multiple users assigned with the same signature, the method comprising steps of determining a plurality of hypothetical signal levels according to a plurality of channel information; obtaining a pre-processed signal according to a received signal received by the receiving device, wherein the pre-processed signal comprises a mixture of a plurality of transmitted signals, and the transmitted signals are generated according to a plurality of signatures and encoded according to a plurality of data signals; calculating a plurality of symbol-level probabilities according to the pre-processed signal and the hypothetical signal levels, wherein the number of signatures may be less than the number of users; obtaining a plurality of log-likelihood ratios, corresponding to the users, and generating a plurality of decoded signals corresponding to the plurality of data signals according to the log-likelihood ratios.

Taiwanese patent No. I618372 disclosed the GDMA (Gain-Division Multiple Access) technology, and the GDMA technology utilizes channel gains of users to process the received signal which is the superimposed signal corrupted by noise interference.

Therefore, while the GDMA technology is applied, it is essential for a base station to correctly estimate the channel gain of each user, and to recover the desired signal from the superimposed signal according to the unique channel gain of each user.

In the present mobile communication system, the estimate of channel gains is accomplished by adding known pilot signals. However, the introduction of pilot signals will reduce the spectral efficiency. Moreover, the design of different pilot signals for different users requires prior coordination so as to solve the problem of the superposition of pilot signals.

Therefore, the issue to be addressed is to estimate the channel gain of each user in the uplink multiple access without sacrificing spectral efficiency, employing pilot signals and the prior coordination.

SUMMARY OF THE INVENTION

A main objective of the present invention is to provide a communication system and method, applicable to the uplink multiple access employing pilot-free channel estimation for mobile communications where multiple users communicate with the base station through the same resource. The waiver of pilot signals has the advantage of maintaining spectral efficiency. The base station utilizes the concept of clustering algorithm to classify the received signals into groups so as to estimate some different linear combinations of channel gains of the multiple users. In addition, the base station utilizes the geometrical configuration of these linear combinations to estimate the channel gain corresponding to each user. Finally, the multi-level detection technique (MLDT) in GDMA system is utilized to recover the message of each user.

To achieve the aforementioned object, the present invention provides a communication system, comprising: at least one user with its transmitter, and a receiver.

A binary message sequence of each user is encoded and modulated into a symbol sequence that is transmitted to the receiver through independent transmission channel. The collection of channels used by multiple users for simultaneously transmitting signals to the same receiver is referred to as a multiple access channel.

The receiver utilizes the signal sequence received by the base station to accomplish the estimation of channel gains associated to the multiple users by firstly using the clustering algorithm to classify the received signal sequence into groups to estimate some linear combinations of channel gains of the multiple users, and furthermore, using the geometrical configuration of these linear combinations to obtain the estimated channel gain for each user, and, finally, according to the estimated channel gains, to recover the original message of the binary information sequence transmitted by each user.

In the uplink multiple access in the wireless data transmission, different users simultaneously communicate with the same base station through different transmission paths. Different channel coefficients (channel gains) are the results from different transmission paths. The uplink multiple access of the GDMA technology utilizes different channel gains to separate and distinguish different users, and, therefore, multiple users can simultaneously transmit data in the same resource. While the base station received the corrupted superimposed signal formed by superimposing signals from the multiple users together with noise corruption, the GDMA technology using the MLDT (Multi-Level Detection) utilizes the relationship among the possible signal levels of the superimposed signal generated by different channel gains to retrieve the original message bits transmitted by each user.

The difference between the GDMA technology and the power domain non-orthogonal multiple access technology is that the GDMA technology utilizes the features of different and independent channel gains to distinguish and separate the multiple users, wherein the channel gain features include the different gain amplitudes and different phases of gains, and are not distinguished only by powers. The GDMA technology utilizes the channel gains of the multiple users to deal with the noise-corrupted superimposed signal, and, therefore, in the base station, how to correctly estimate the channel gains of each user is essential. In the present mobile communication system, the channel estimation is usually accomplished by employing pilot signals, and, however, at the same time, the spectral efficiency is also reduced by introducing too many pilot signals irrelevant to the data, and moreover the arrangement to avoid the collision of different pilot signals from the different users involves the prior coordination issue. Therefore, how to maintain the regular spectral efficiency and avoid the prior coordination issue, and, at the same time, to precisely estimate the channel gains of the multiple users is an issue of interest of the present invention.

The clustering algorithm is a method of unsupervised learning and is a common technique for statistical data analysis, which involves the grouping of samples and aims to make the samples in the same group have similar properties while the samples in different groups have dissimilar properties. The clustering algorithm is composed of two main steps of recursive optimization algorithm, which include finding out multiple centroids of input data, and utilizing the distances between the input data and the multiple centroids to group the input data.

In the wireless communication, the modulated symbol for each user after transmission through the fading channel is equivalent to multiplying the symbol by the user-specific channel coefficient, also known as channel gain. Therefore, under the same resource, the superimposed signal received by the base station excluding noise is a linear combination of channel gains correspond to the multiple users. In different data transmissions, there are different message combinations among the multiple users which result in different linear combinations of channel gains. These linear combinations of channel gains are called the levels of the superimposed signals. If these channels are unchanged for a certain period of time, the base station can utilize the clustering algorithm to estimate all the levels of superimposed signals after the receiver receives enough signals which are corrupted by noise. Then, we can utilize the geometrical configuration of the levels of superimposed signals to estimate the channel gain corresponding to the transmission of each user.

All the levels of the superimposed signal received by the receiver in the base station are determined by the linear combinations of channel gains of multiple users, where the superimposed signal may be corrupted by the noise in the receiver end. How to design an effective algorithm to reliably group the received superimposed signal sequence is an important issue. The present invention employs the symmetry of the set formed by the possible levels of the superimposed signals to increase the reliability of the clustering algorithm and also increase the accuracy of the subsequent multiple-user channel estimation.

The clustering algorithm can estimate each level of the superimposed signal, which corresponds to only one of the possible linear combinations of the channel gains of the multiple users. The present invention further utilizes the geometrical configuration of the levels of the superimposed signal to estimate the channel gain corresponding to each user.

The method of estimation for channel gains of multiple users of the present invention directly utilizes signals carrying user message as input data. The advantage is that the spectral efficiency is not sacrificed by avoiding the use of pilot signal in channel estimation. However, there is still a problem left which is the phase-ambiguity in the receiver end. Nevertheless, this issue can be solved by traditional methods such as, introducing differential encoding in the transmission end or using non-coherent block coding.

The multi-level detection technique in GDMA system allows P users to share the same resource, where each received symbol is a superimposed signal composed of signals transmitted from P users. Suppose that the signal sent from each user is one of the $2^m$ signal points in the constellation. The superimposed signal then has $2^{mP}$ possible levels. For the purpose of channel estimation in GDMA system, all the levels should be distinguished. This is accomplished by classifying a set of received symbols into $2^{mP}$ clusters and then finding the associated centroids.

When the communication system of the present invention is used to perform the communication method for P users with $2^m$ signal points in the constellation of each modulated signal, the first step is to perform picking initial centroids processing, wherein $2^{mP}$ centroids are obtained randomly or according to a certain rule.

Then, the next step is to perform a grouping operation. Distances between the input data and the centroids are utilized to group the input data and to find out the centroid closest to each input symbol, and then the each input symbol and the centroid are grouped as one cluster (group). That means, the n input symbols of the received input data sequence are classified into $2^{mP}$ groups by applying the nearest-neighbor rule with respect to the current centroids, and the average of symbols corresponding to each group will be used as an updated centroid of the each group.

Then, the next step is to perform a grouping operation again according to the updated $2^{mP}$ centroids, and then to re-compute the average of each group to further update the centroids.

Then, the next step is to perform the convergence processing. It is to iteratively perform the grouping operation until the variation between the set of centroids and its updated version is less than a pre-determined threshold value.

Then, the next step is to perform computing an average of the centroids processing. It is to compute the average of the obtained $2^{mP}$ centroids, wherein if the magnitude of average is greater than a pre-determined threshold value, the processing is to go back to the step of performing picking initial centroids processing, otherwise the clustering algorithm is terminated.

Finally, the centroids are obtained, and each one of the centroids corresponds to the estimate of one of the $2^{mP}$ levels of the possible superimposed signals.

The foregoing will become better understood from a careful reading of a detailed description provided herein below with appropriate reference to the accompanying drawings.

BRIEF DESCRIPTION OF THE DRAWINGS

The embodiments can be understood in more detail by reading the subsequent detailed description in conjunction with the examples and references made to the accompanying drawings, wherein:

FIG. 5 is a schematic view to illustrate the mapping rules for superimposed signal in the case of m=1 and P=2;

FIG. 9 is a schematic view to illustrate the mapping rules for superimposed signals in the case of m=1 and P=3;

FIG. 10a and FIG. 10b are used to illustrate an example of superimposed levels in the case of m=1 and P=3.

DETAILED DESCRIPTION OF THE DISCLOSED EMBODIMENTS

Figure 1:
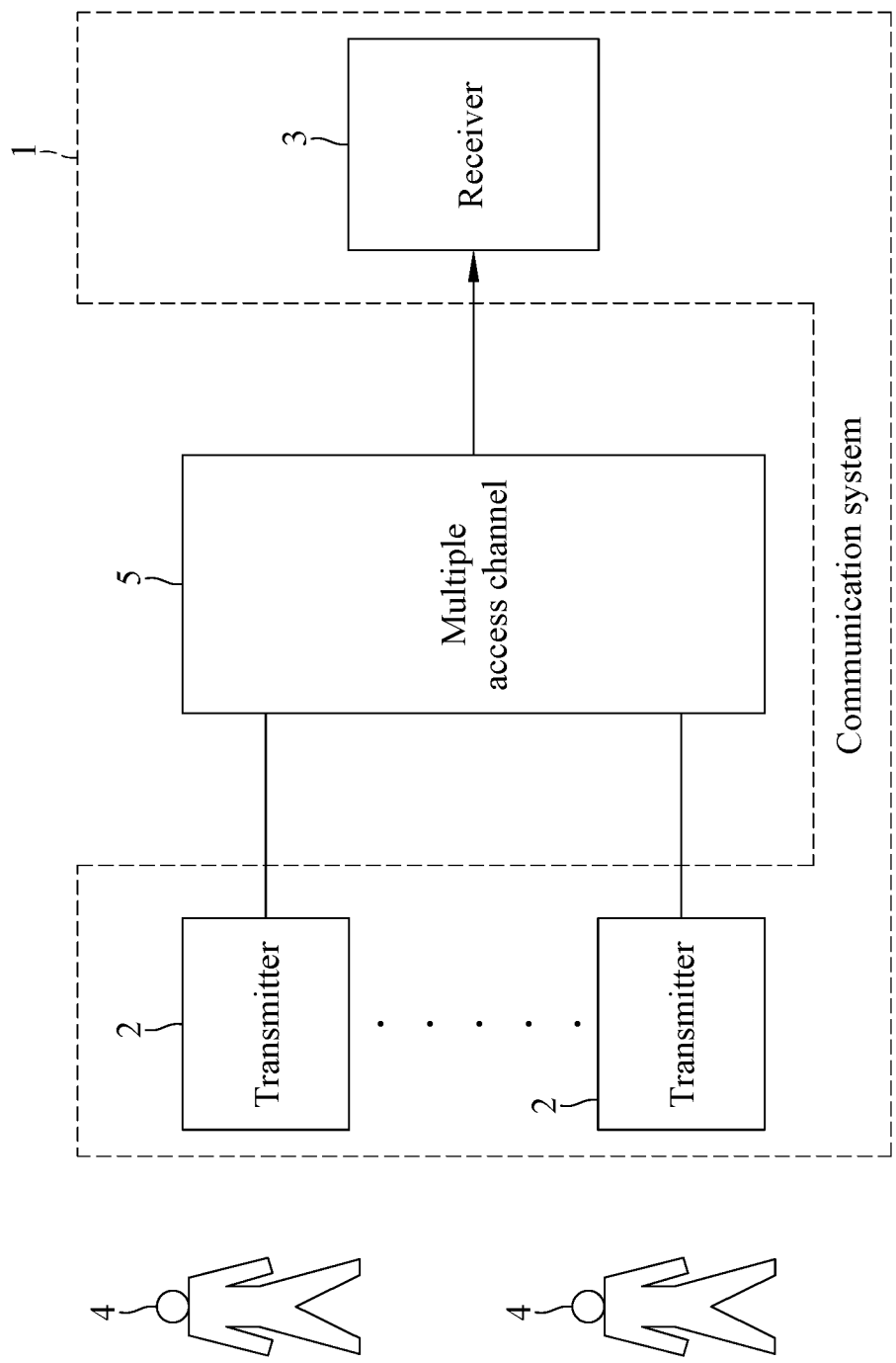
FIG. 1 is a schematic view to illustrate the system architecture and the operation of a communication system according to the present invention

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

FIG. 1 is a schematic view to illustrate the system architecture and the operation of a communication system according to the present invention. As shown in FIG. 1, the communication system 1 comprises P transmitters 2, and a receiver 3, wherein P is an integer which is greater than or equal to 1.

The P transmitters: the binary message sequence transmitted by each of P users 4 is encoded and modulated by a corresponding transmitter 2 to obtain a modulated symbol sequence, and, then, the modulated symbol sequence is transmitted to the receiver 3 through an independent fading channel of the multiple access channel 5.

The receiver 3: the receiver 3 inside the base station receives the noise-corrupted superimposed signal sequence formed by the symbol sequences transmitted from the P transmitters with noise corruption.

The receiver 3 exploits the signal sequence received by the base station to accomplish the channel estimation of the multiple users. Firstly, uses the clustering algorithm to group the received signal sequence to estimate some linear combinations of channel gains of the multiple users, and furthermore, uses the geometry configuration of the linear combinations to estimate the channel gain corresponding to each user, and, finally, according to the estimated channel gains, utilizes the multi-level detection technique (MLDT) in GDMA system to recover the original message of the binary message sequence transmitted by each user.

In the uplink multiple access for wireless data transmission, different users 4 simultaneously communicate with the same base station through different transmission paths. Different channel gains are the results from different transmission paths. The GDMA system utilizes the different channel gains to distinguish and separate the signals transmitted by the different users under a precondition that the channel gain between each user 4 and the receiver 3 in the base station are known. The GDMA technology utilizes the relationship among the possible signal levels of the superimposed signal generated by different channel gains to retrieve the original message bits transmitted by each user 4. The purpose of the present invention is to directly employ the noise-corrupted superimposed signal sequence to execute the channel estimation, and the estimated channel gains can be used by GDMA technology to further detect the original message transmitted by the different users 4.

The GDMA technology is to employ the channel gains of the multiple users to detect the superimposed signal, and, therefore, in the base station, how to correctly estimate the channel gain of each user is essential. In the present mobile communication system, the channel estimation is usually accomplished by employing pilot signals, and, however, at the same time, the spectral efficiency is also reduced by introducing too many pilot signals irrelevant to the data, and the arrangement to avoid the collision of different pilot signals from the different users involves the prior coordination issue. Therefore, how to maintain the regular spectral efficiency and avoid the prior coordination, and, at the same time, to precisely estimate the channel gains of the multiple users is an issue of interest of the present invention.

In other words, according to the technical features of the present invention, in the mobile communication system, the channel estimation can be accomplished without introducing pilot signals. Therefore, the spectral efficiency will not be sacrificed and the prior coordination for avoiding the collision of pilot signals is not needed.

The clustering algorithm is a method of unsupervised learning and is a common technique for statistical data analysis, which involves the grouping of samples and aims to make the samples in the same group have similar properties while the samples in different groups have dissimilar properties. The clustering algorithm is composed of two main steps of recursive optimization algorithm, which include finding out multiple centroids of input data, and utilizing the distances between the input data and the multiple centroids to group the input data.

In the wireless communication, the modulated symbol for each user 4 after transmission through the fading channel is equivalent to multiplying the symbol by the user-specific channel coefficient, also known as channel gain. Therefore, under the same resource, the superimposed signal received by the base station excluding noise is a linear combination of channel gains correspond to the multiple users 4. In different data transmissions, there are different message combinations among the multiple users 4 which result in different linear combinations of channel gains. These linear combinations of channel gains are called the levels of the superimposed signals.

If these channels are unchanged for a certain period of time, the base station can utilize the clustering algorithm to estimate all the levels of superimposed signals after the receiver 3 receives enough signals which are corrupted by noise. Then, we can utilize the geometrical configuration of the levels of superimposed signals to estimate the channel gain corresponding to the transmission of each user 4.

All the levels of the superimposed signal received by the receiver 3 in the base station are determined by the linear combinations of channel gains of multiple users 4, where the superimposed signal may be corrupted by the noise in the receiver 3 end. How to design an effective algorithm to reliably group the received superimposed signal sequence is an important issue. The present invention employs the symmetry of sets formed by the levels of the superimposed signal to increase the reliability of the clustering algorithm and also increase the accuracy of the subsequent multiple-user channel estimation.

The clustering algorithm can estimate each level of the superimposed signal, which corresponds to only one of the possible linear combinations of the channel gains of the multiple users 4. The present invention further utilizes the geometrical configuration of the levels of the superimposed signal to estimate the channel gain corresponding to signal transmission of each user 4.

The method of estimation for channel gains of multiple users 4 of the present invention directly utilizes signals carrying user message as input data. The advantage is that the spectral efficiency is not sacrificed by avoiding the use of pilot signal in channel estimation. However, there is still a problem left which is the phase-ambiguity in the receiver 3 end. Nevertheless, this issue can be solved by traditional methods such as, introducing differential encoding in the transmission end or using non-coherent block coding.

In the at least one embodiment of the present invention, any one of the P transmitters 2 of the communication system 1 can be embedded in a mobile phone of each of the different users 4. The transmitter 2 is composed of at least one of the hardware, the software, and the firmware. And the receiver 3 can be embedded in the base station and composed of at least one of the hardware, the software, and the firmware.

According to the embodiments of the present invention, any one of the P transmitters 2 of the communication system 1 can also be embedded in at least one of the Tablet, iPad, and the sensor.

Figure 2:
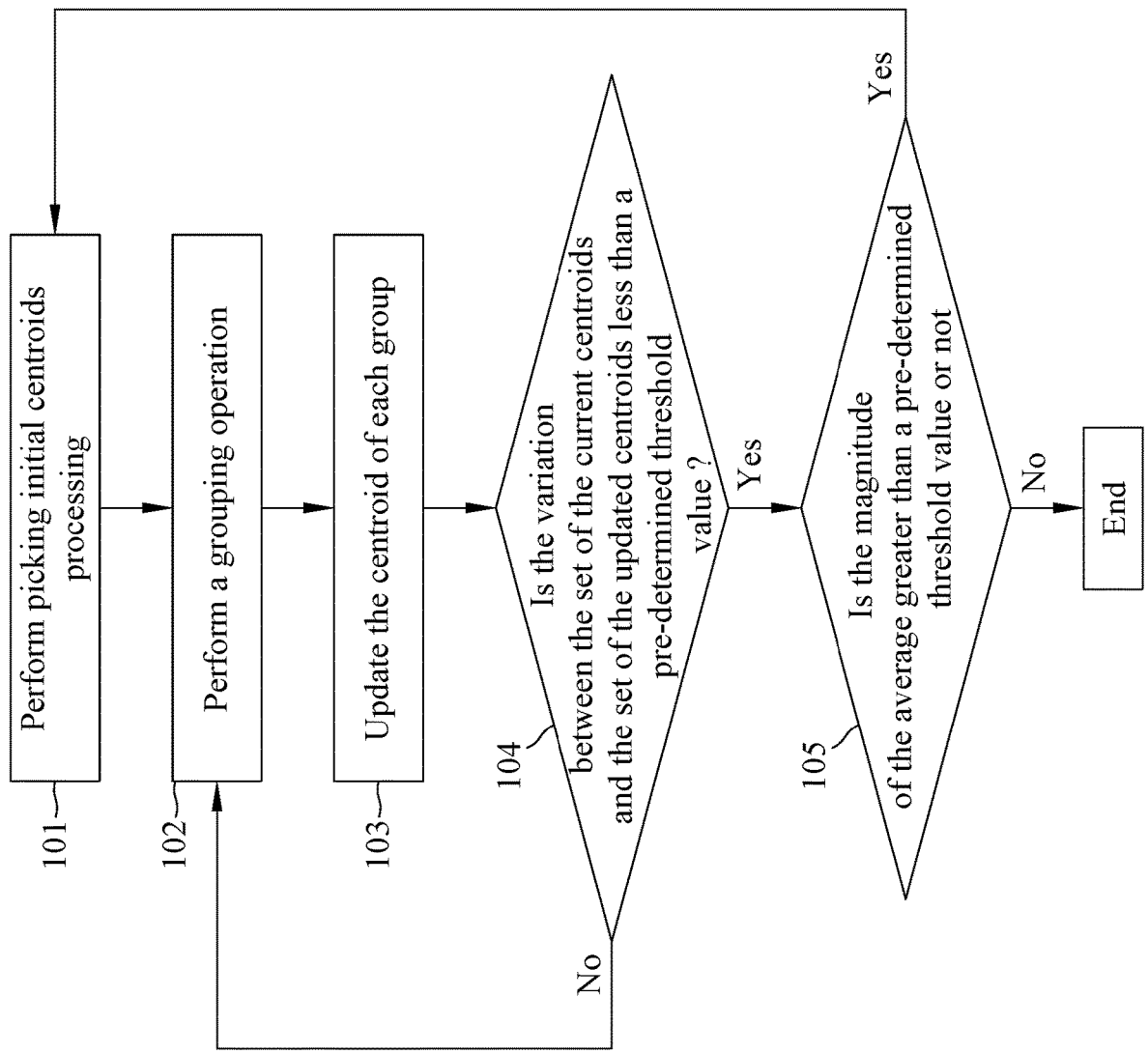
FIG. 2 is a flowchart of the clustering algorithm to illustrate the communication method utilizing the communication system of the present invention in FIG. 1.

FIG. 2 is a flowchart of the clustering algorithm to illustrate the communication method utilizing the present invention in FIG. 1. As shown in FIG. 2, step 101 is to perform picking initial centroids processing, where the receiver 3 selects multiple centroids in a random way or in some specific method. Then, proceed to step 102.

Step 102 is to perform a grouping operation; distances between the input data and the centroids are utilized to group the input data and to find out the centroid closest to each input symbol; the input symbol and the centroid are classified into the same group (cluster). Then, proceed to step 103.

Step 103 is to update the centroid of each group, wherein, the average of the symbols corresponding to each group is the updated centroid of the each group, and each updated centroid will correspond to an estimate of a level of the superimposed signals. Then, proceed to step 104.

Step 104 is to perform the convergence processing. Proceed to step 102 for iteratively performing the grouping operation until the variation between the set of the current centroids and the set of the updated centroids is less than a pre-determined threshold value. Then, proceed to step 105.

Step 105 is to perform computing an average of the centroids processing; and it is to compute the average of the set of obtained centroids. If the magnitude of the average is greater than a pre-determined threshold value, the processing is to back to the step 101 to perform picking initial centroids processing, otherwise the clustering algorithm is terminated.

The clustering algorithm is to classify the received symbols into multiple groups, and the centroid corresponding to each group is the estimate of one of the levels of the superimposed signals. In step 105, the present invention utilizes the symmetry of the levels of the superimposed signals to check whether the grouping results is correct or not so as to avoid incorrect results and increase the reliability of the clustering algorithm.

In setting up initial centroids of the multiple groups in the step 101, many known algorithms can be utilized, such as, the K-means algorithm, the K-means++ algorithm, or the LBG (Linde-Buzo-Gray) algorithm.

As for the step 102 to the step 104, if each input symbol is corresponding to only one centroid, a hard clustering algorithm can be utilized; if each input symbol can be corresponding to multiple centroids, a soft clustering algorithm can be utilized; and, for example, by using an expected value and the EM (expectation-maximization) algorithm, centroids of the input data can be obtained based on the GMM (Gaussian mixture model). The ultimate purpose of those algorithms is classify the input data and to find out the centroid of the individual group.

After the centroid of each group, which is one of the levels of the superimposed signals, is obtained, the present invention utilizes the geometry configuration of the levels of the superimposed signals to estimate the channel gain corresponding to the signal transmitted by each user 4. The message bits of each user 4 can be recovered by the multi-level detection technique (MLDT) in GDMA system.

Figure 3:
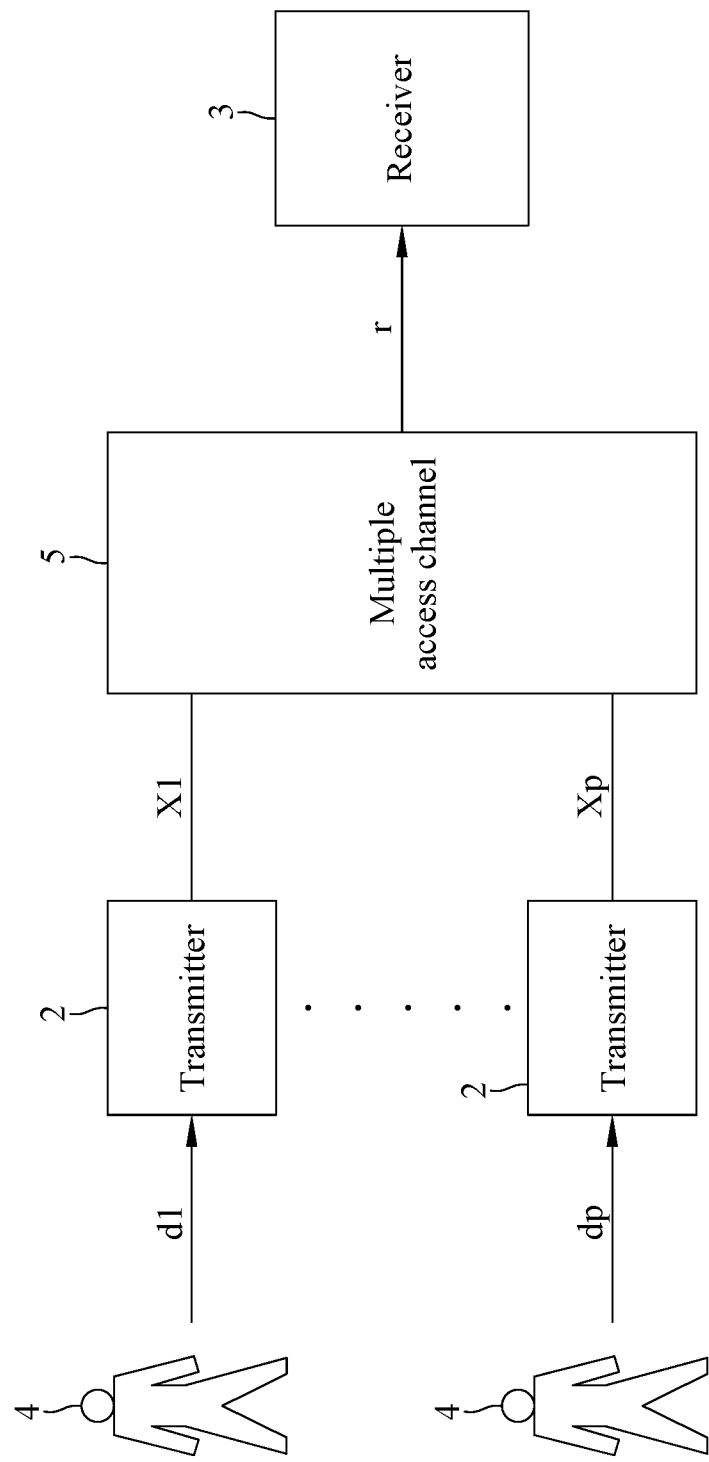
FIG. 3 is a schematic view to illustrate an embodiment and related operation of the present invention.

FIG. 3 is a schematic view to illustrate an embodiment and related operation of the present invention. As shown in FIG. 3, a communication system 1 comprises P transmitters 2, and a receiver 3, wherein P is an integer and at least 1.

The P transmitters 2: a binary information sequence from each user 4 is encoded and modulated by a corresponding transmitter 2 of the P transmitters 2 to obtain a modulated symbols sequence, and, then, the modulated symbols sequence is transmitted to the receiver 3 through an independent fading channel in the multiple access channel 5.

In the system model of GDMA, there are P user equipments (UEs) in the transmission side at the same time, wherein, for example, P transmitters 2 share the same resource to transmit signals to the base station. It is supposed that P, $p \in \{1, 2, \ldots P\}$, is a unique serial number assigned to each single user equipment UE (transmitter 2), and a binary information sequence $d_p$ of UE-p is encoded by a forward error-correcting (FEC) code into a binary sequence $c_p=(c_{p1}, c_{p2}, \ldots, c_{pj}, \ldots)$ which is converted into the modulated signal (modulated symbol sequence) $x_p=(x_{p1}, x_{p2}, \ldots, x_{pj}, \ldots)$, wherein there are $2^m$ possible levels in each symbol $x_{pj}$ of the modulated symbol sequence. In the following, we drop the symbol index j for brevity and the levels are distinguishable due to the effect of independent fading channels. Each user equipment (UE) 2 simultaneously transmits signals to the base station over an independent fading channel in the multiple access channel 5. Under the condition that the symbol timing of each transmission is assumed to be perfectly aligned, the receiver 3 in the base station receives symbols, and each of the received symbols in the sequence can be represented as $r=\sum_{p=1}^{P} h_p x_p + w = s + w$, where $h_p$ is the channel coefficient between UE-p (User Equipment P) and the receiver 3 in the base station, and w is the complex additive white Gaussian noise (AWGN). The symbol s is the superimposed symbol determined by the signals transmitted from user equipments (UEs) of the P users and channel gains. There are $2^{mP}$ possible results in each s, wherein each result (linear combination) of the superimposed signal s is called a level of the superimposed signals. That is, there are $2^{mP}$ possible levels in each s, and the possible levels of s are denoted as S[l] with $l \in \{0, 1, \ldots, 2^{mP}-1\}$.

The multi-level detection technique (MLDT) in the ordinary GDMA system is utilized to calculate a posteriori probabilities (APPs) of each S[l] and, then, to find out log-likelihood ratio of each bit $c_p$ and, accordingly, to detect the original message bit $d_p$ transmitted by each user equipment UE. The purpose of the present invention is to directly utilize the received superimposed signal sequence to execute the channel estimation to obtain the estimate of channel gains for the multi-level detection technology in the GDMA. Therefore, the original message transmitted by the P user equipments can be detected without the prior information of the channel gains.

If the user-specific channel used by P user equipments are unchanged in the transmission period of the consecutive n symbols, it means that the $2^{mP}$ possible levels of the superimposed signals are unchanged, and each symbol s received in the transmission period would be one of the fixed $2^{mP}$ possible levels with additive white Gaussian noise (AWGN). Then, the present invention utilizes the clustering algorithm, and the received consecutive n symbols, r(1), r(2), . . . r(n), can be represented as the sequence $r=[r(1), r(2), \ldots, r(n)]$, and as the input data of the clustering algorithm. The clustering algorithm can classify the n input symbols into $2^{mP}$ groups, and the average of symbols corresponding to each group is called the centroid of the each group and each centroid is corresponding to the estimate of a level of the superimposed signals. The channel gain corresponding to signals transmitted by each user can be recovered by utilizing the geometrical configuration of the received superimposed signals, and, then, the binary message sequence $d_p$ can be recovered by using the multi-level detection technology of the GDMA system.

Based on modifying the k-means++ algorithm, the present invention designs an efficient initialization algorithm. The steps of the reliable initialization algorithm are organized as follows.

Step 1) Randomly pick a symbol from the received n input symbols as a first centroid and set i=1.

Step 2) Calculate the distance D(r) between each input symbol r and the nearest initial centroid. Record the $n/(2^{mP})$ symbols with the largest D(r) values and randomly pick the next initial centroid from these $n/(2^{mP})$ symbols with probability proportional to $D^2(r)$ and then set i=i+1.

Step 3) Return to Step 2 until $i=2^{mP}$.

Step 4) Proceed to the clustering algorithm for further process after obtaining $2^{mP}$ initial centroids.

Figure 4:
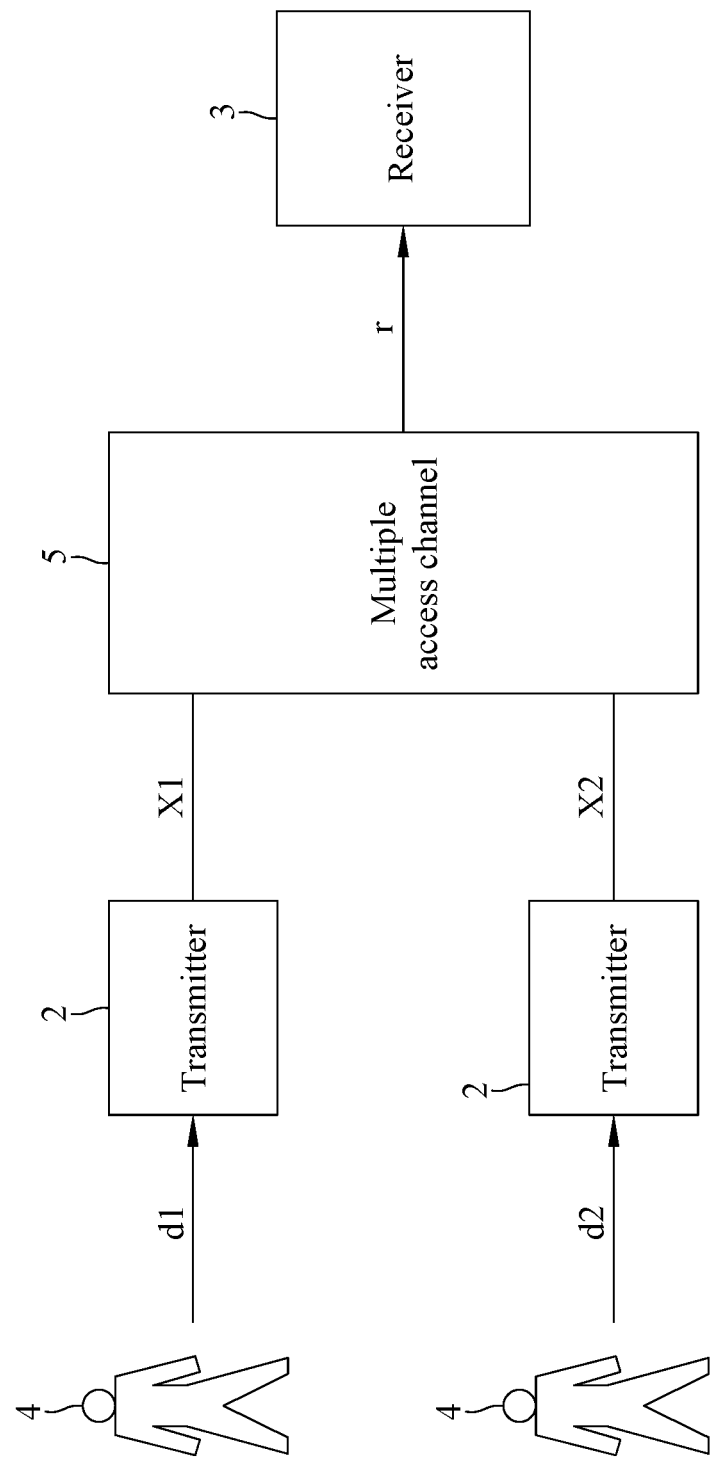
FIG. 4 is a schematic view to illustrate another embodiment and related operation of the present invention.

FIG. 4 is a schematic view to illustrate another embodiment and related operation of the present invention. As shown in FIG. 4, a communication system 1 comprises P transmitters 2, and a receiver 3, wherein P is equal to 2 (P=2), and m is equal to 1 (m=1).

For example, as the number P of user equipments UEs is 2, the UE-1 and UE-2 are modulated by the BPSK (Binary Phase Shift Keying) technology (m=1).

Figure 5:
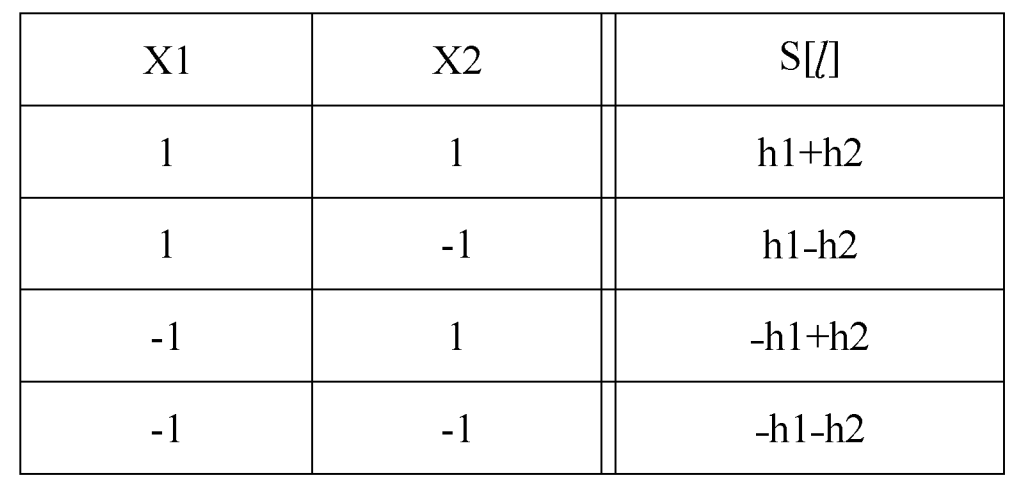

FIG. 5 is a schematic view to illustrate the mapping rules for superimposed signal in the case of m=1 and P=2. As shown in FIG. 5, there are 4 possible levels of the superimposed signal s, and the 4 possible levels are $S[0]=h_1+h_2$, $S[1]=h_1-h_2$, $S[2]=-h_1+h_2$, and $S[3]=-h_1-h_2$.

The correspondence between the transmission symbols and the superimposed signal is that S[0] corresponds to $x_1=1$ and $x_2=1$, S[1] corresponds to $x_1=1$ and $x_2=-1$, S[2] corresponds to $x_1=-1$ and $x_2=1$, and S[3] corresponds to $x_1=-1$ and $x_2=-1$.

Figure 6:
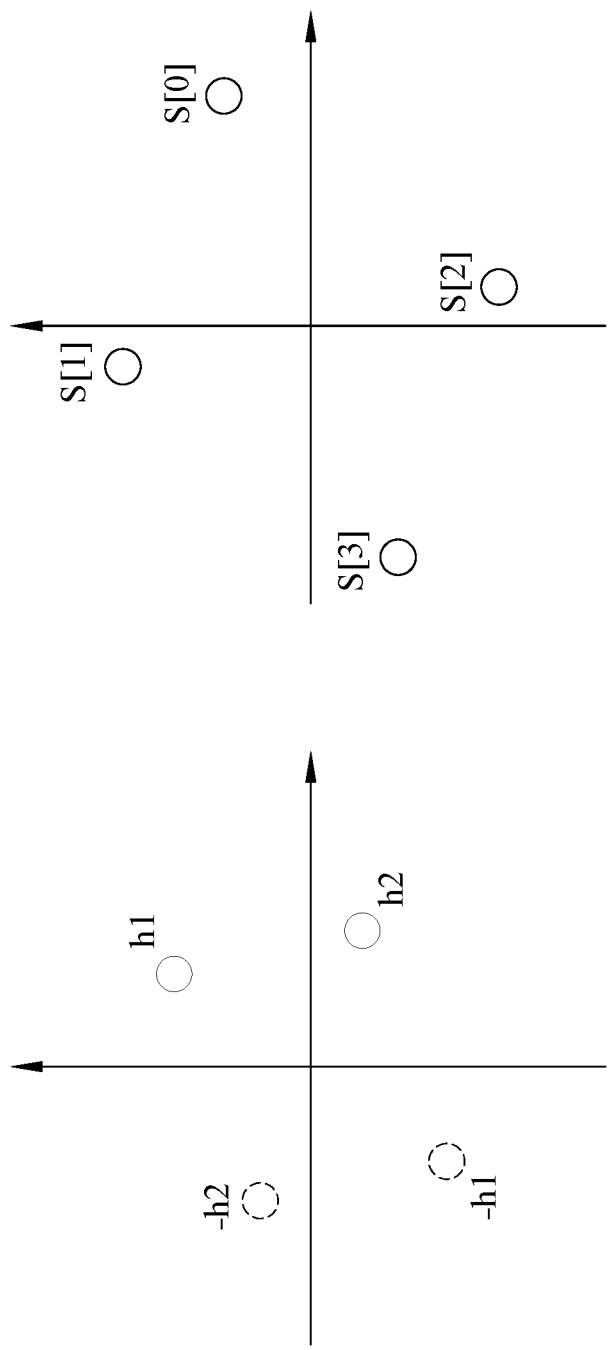
FIG. 6a and FIG. 6b are used to illustrate an example of superimposed levels in the case of m=1 and P=2.

FIG. 6a and FIG. 6b are used to illustrate an example of superimposed levels in the case of m=1 and P=2.

As shown in FIG. 6a and FIG. 6b, after finding the four ($2^{mP}=4$, P=2 and m=1) centroids representing the estimated levels of the superposed signals, the present invention further proposes an algorithm to recover the individual channel coefficient of each user equipment UE from the multiple levels of the superimposed signals. As for the transmission system modulated by the BPSK (m=1) technology, the multiple levels of the superimposed signal received by the receiver end can be used to form multiple parallelograms. For example, as for P=2 and m=1, four levels of the superimposed signal can be connected into a parallelogram. The channel coefficients corresponding to the P user equipments UEs can be obtained through the midpoints of the four edges of these parallelograms. For example, under the assumption that each of the multiple centroids obtained by using the clustering algorithm is exactly equal to each level, where P is equal to 2 and m is equal to 1, the first step is to randomly pick a first centroid, and then to find out a second centroid from the three remaining centroids, wherein the first centroid and the second centroid add up to exactly zero. The first centroid and the second centroid form a pair, such as S[1] and S[2], and the remaining two centroids of the four centroids form another pair, such as S[0] and S[3]. The second step is to find out the relationship between the four edges of a parallelogram by pairing multiple centroids. For example, a centroid S[1] is randomly pick up from a first pair, S[1] is connected to S[3] and S[0] of another pair, respectively, to obtain two adjacent edges, such as S[1]-S[3] edge and S[1]-S[0] edge, of the parallelogram.

The two individual midpoints on the two adjacent edges are two channel coefficients (or multiplied by −1), respectively, which correspond to signals transmitted by two user equipments UEs, respectively. That is, the midpoint of the S[1]-S[3] edge corresponds to $h_2$ (or $-h_2$), and the midpoint of the S[1]-S[0] edge corresponds to $h_1$ (or $-h_1$). The two midpoints on the remaining two edges correspond to $-h_2$ (or $h_2$) and $-h_1$ (or $h_1$) respectively. There is a problem of 180 degree phase ambiguity in determining the channel coefficients for $h_1$ and $h_2$. However, this problem can be solved by using the traditional methods, such as the differential encoding or the noncoherent block coding (NBC).

Figure 7:
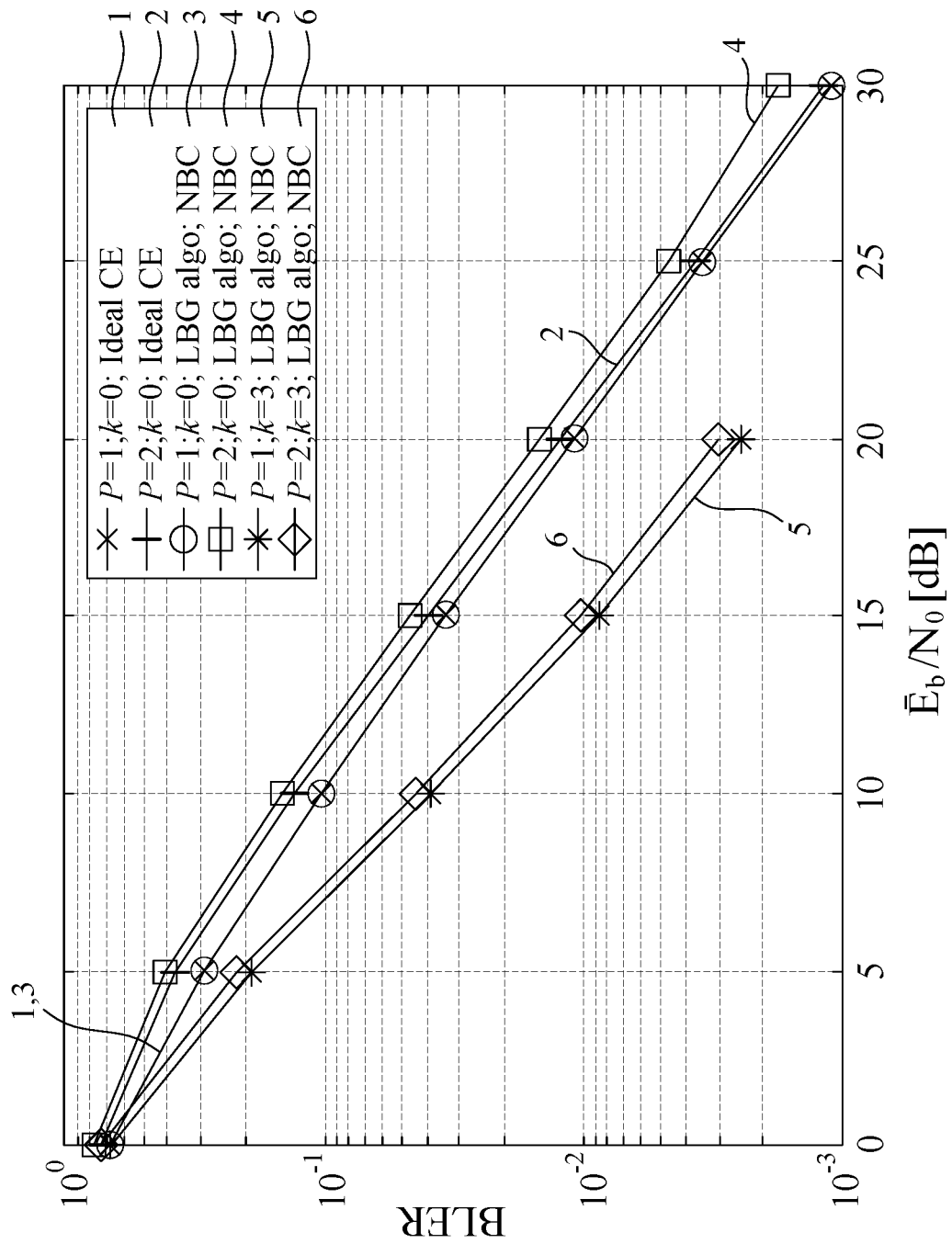
FIG. 7 is a schematic view to illustrate BLER (block error rate) performance of a (256, 128) Polar-coded system employing the embodiment with k=0 and k=3 over the Rician fading channel.

FIG. 7 is a schematic view to illustrate BLER (block error rate) performance of (256, 128) Polar-coded system employing the embodiment over Rician fading channels with k=0 and k=3.

When the NBC (Noncoherent Block Coding) algorithm and the LBG (Linde-Buzo-Gray) algorithm are used in this embodiment, the difference of BLER between the single-user case, i.e., P=1, and the two-user case, i.e., P=2, is small. Moreover, the difference of BLER between using the channel estimation and using the ideal channel gain is also small.

Figure 8:
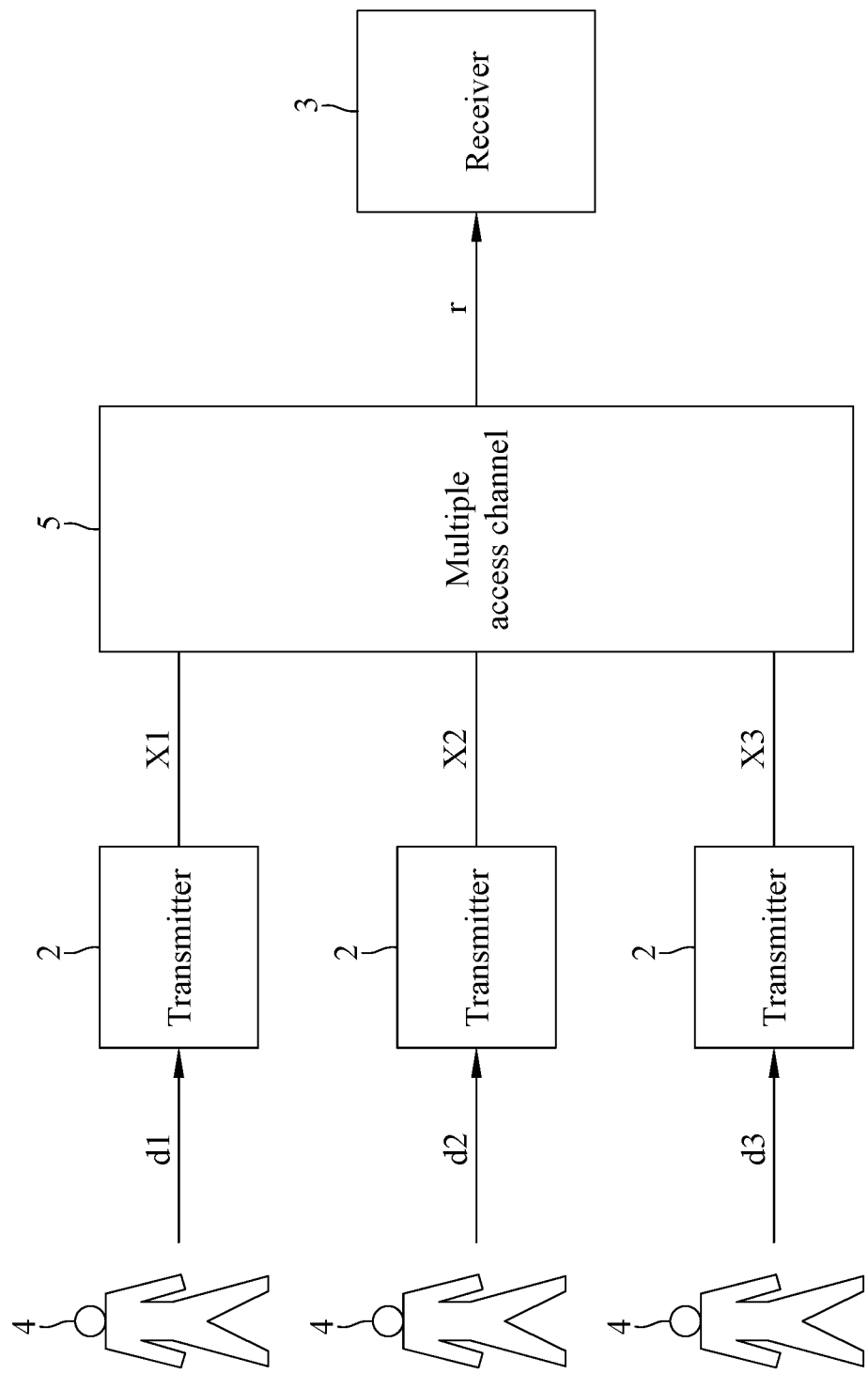
FIG. 8 is a schematic view to illustrate another embodiment and related operation of the present invention.

FIG. 8 is a schematic view to illustrate another embodiment and related operation of the present invention. As shown in FIG. 8, a communication system 1 comprises P transmitter 2, and a receiver 3, wherein P is equal to 3 and m is equal to 1.

For example, as the number P of user equipments UEs is 3, the UE-1, UE-2, and UE-3 are modulated by the BPSK (Binary Phase Shift Keying) technology.

FIG. 9 is a schematic view to illustrate the mapping rules for superimposed signals in the case of m=1 and P=3.

As shown in FIG. 9, there are eight possible levels of the superimposed signal s, and the eight possible levels are $S[0]=h_1+h_2+h_3$, $S[1]=h_1+h_2-h_3$, $S[2]=h_1-h_2+h_3$, $S[3]=h_1-h_2-h_3$, $S[4]=-h_1+h_2+h_3$, $S[5]=-h_1+h_2-h_3$, $S[6]=-h_1-h_2+h_3$, and $S[7]=-h_1-h_2-h_3$. For example, in the case of m=1 and P=3, the mapping rules for codeword bits of users, denoted as user-1, user-2 and user-3, and levels of the superimposed signal are tabulated in FIG. 9 There are eight possible levels in each superimposed symbol 3.

FIG. 10a and FIG. 10b are used to illustrate an example of superimposed levels in the case of m=1 and P=3.

FIG. 10c to FIG. 10g are used to illustrate the derivation of coefficients in the case of P=3 and BPSK transmission.

As shown from FIGS. 10a to 10g, after finding the eight centroids representing the estimation values of the levels of the superposed signals, the present invention further proposes an algorithm to recover the individual channel coefficient of each user equipment UE from the multiple levels of the superimposed signal. The multiple levels of the superimposed signal can be connected into multiple parallelograms. The channel coefficients corresponding to the P user equipments UEs can be obtained through the midpoints of the edges of these parallelograms.

For example, under the conditions that each of the multiple centroids obtained by using the clustering algorithm is exactly equal to each level, and P is equal to 3 and m is equal to 1, eight centroids can form a total of six parallelograms.

The invention checks whether the midpoints on the edges of the two parallelograms in each group overlap or not so as to obtain the channel coefficients corresponding to signal transmitted by the three user equipments UEs, respectively.

Figure 10D:
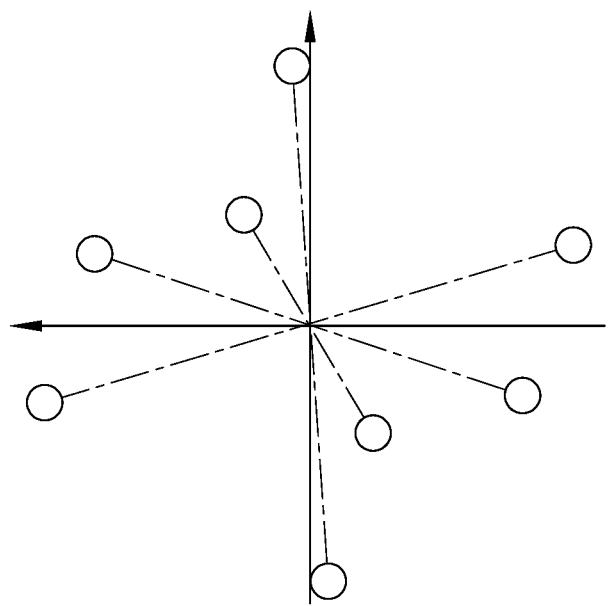
FIG. 10c to FIG. 10g are used to illustrate the derivation of coefficients in the case of P=3 and BPSK transmission.
Figure 10C:
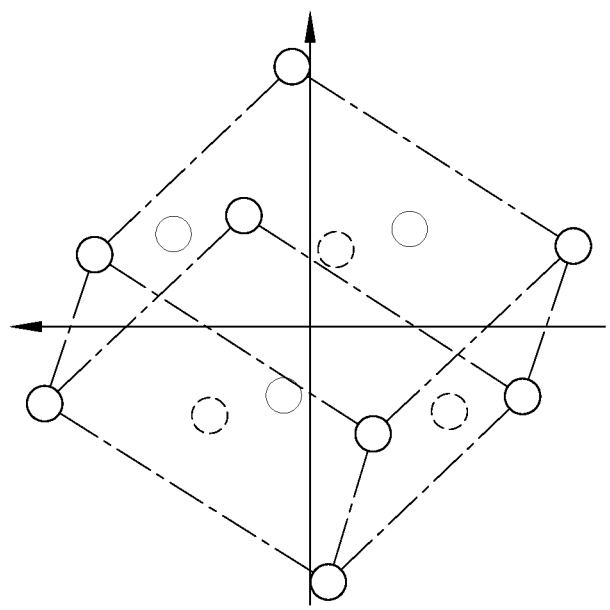
Figure 10G:
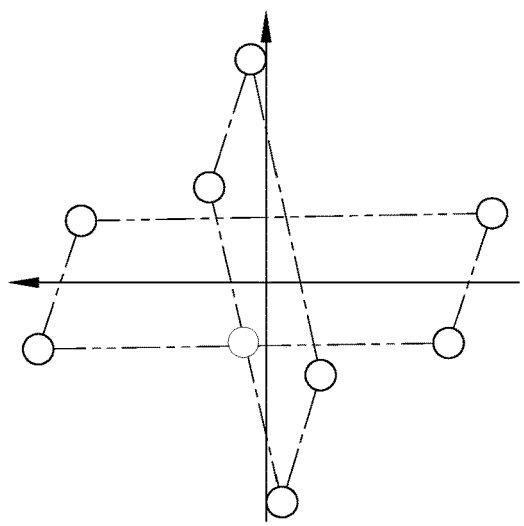
Figure 10F:
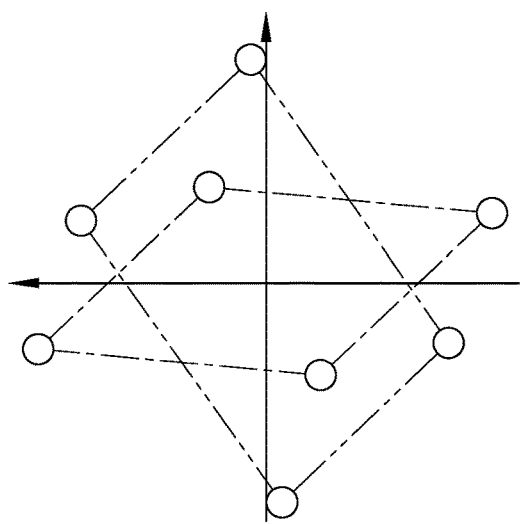
Figure 10E:
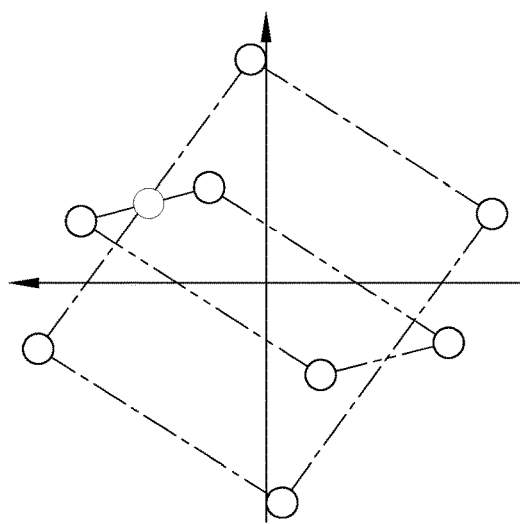

To find the coefficients, the first step is to pair the eight centroids with the sum of each pair including two centroids is equal to zero. In FIG. 10(d), pairs A, B, C and D are found, and the order of pairs is arbitrary.

In the second step, as shown in FIG. 10(d), after pairs A, B, C and D are successfully found and the order of pairs is arbitrary, pick pair A and pair B which are composed of a total of four centroids to form a parallelogram, while the remaining four centroids form another parallelogram. Find the intersection of the two parallelograms, which is composed of four midpoints located on the edges of both parallelograms. Two of the midpoints are overlapped and the other two midpoints are also overlapped. Two overlapped midpoints represent the channel coefficient corresponding to one of the UEs, and the other two midpoints represent the channel coefficient multiplied by −1.

In the third step, pick pair A and pair C which are composed of a total of four centroids to form a parallelogram, while the remaining four centroids form another parallelogram. Then, two overlapped midpoints on the edges of two parallelograms represent the channel coefficient corresponding to the second UEs, and the other two overlapped midpoints represent the channel coefficient multiplied by −1.

In the fourth step, pick pair A and pair D which are composed of a total of four centroids to form a parallelogram, while the remaining four centroids form another parallelogram. Then, two overlapped midpoints on the edges of two parallelograms represent the channel coefficient corresponding to the third UEs, and the other two overlapped midpoints represent the channel coefficient multiplied by −1.

In the above steps, each centroid of the multiple centroids obtained by utilizing the cluster algorithm is exactly equal to a level of the multiple levels. When the received signal is corrupted by noise, the obtained centroids may deviate from actual levels of the superimposed signals. Therefore, in the above step, pairing the eight centroids with the sum of each pair equal to zero is replaced by pairing the eight centroids with the sum of each pair closest to zero. For p=3 and m=1, in the two parallelograms of each group, the two overlapped midpoints are replaced by two closest midpoints, and, then, after averaging the two closest midpoints, the estimation value of the channel gain is obtained. The algorithm proposed by the present invention mainly utilizes the geometrical configuration of the levels, the midpoints on the edges of each parallelogram are found by pairing the centroids, and this method can also be applied in the QPSK (Quadrature Phase-Shift Keying) transmission system.

In order to avoid using the pilot signal in channel estimation, the present invention can estimate the channel coefficient corresponding to each user equipment UE through the received superimposed signal sequence. However, there is still the problem of phase ambiguity in the obtained estimation values of the channel coefficients. For example, if the user equipment UE is modulated by the BPSK, there is a 180 degree phase ambiguity in the channel coefficients estimated by the method. The phase ambiguity problem can be solved by a traditional method such as, introducing differential encoding in the transmission end or using noncoherent block coding to remove the phase ambiguity in the estimation.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A communication method, applicable to uplink multiple access of a communication system for mobile communication, comprising the following steps:
    simultaneously transmitting messages to a base station by multiple users in a transmission end, wherein the base station utilizes a clustering algorithm to process a signal sequence received by the base station as input data of the clustering algorithm, and to find out multiple centroids of the input data, and wherein the multiple centroids are estimation values of multiple levels of superimposed signals composed of signals transmitted by at least one user;
    utilizing a geometry configuration of the multiple levels of the superimposed signals to estimate a channel gain corresponding to each of the at least one user; and
    utilizing an estimation value of the channel gain corresponding to each of the at least one user to recover the messages transmitted by each user.

2. The communication method as claimed in claim 1, wherein the clustering algorithm of the communication method comprises the following steps:
    performing a process of picking initial centroids, wherein the signal sequence received by the base station is used as the input data to select initial centroids of the input data;
    performing a grouping operation, wherein distances between the input data and the multiple centroids are utilized to group the input data into multiple clusters;
    performing an updating centroids operation, wherein, an average of symbols corresponding to each cluster is an updated centroid of the cluster, and each updated centroid is corresponding to an estimation value of a level of the superimposed signals;
    performing iterative processing, wherein the grouping operation and the updating centroids operation are processed iteratively until a variation between current centroids and the updated centroids is less than a pre-determined threshold value; and
    performing a process of computing an average of the centroids, wherein an average value of obtained multiple centroids is computed, and if a magnitude of the average value is greater than a pre-determined threshold value, the clustering algorithm returns to the step of performing the process of picking initial centroids.

3. The communication method as claimed in claim 2, wherein the initial centroids are picked by utilizing a K-means++ algorithm.

4. The communication method as claimed in claim 2, wherein the initial centroids are picked by utilizing an LBG (Linde-Buzo-Gray) algorithm.

5. The communication method as claimed in claim 2, wherein an algorithm being modified based on a K-means++ algorithm to pick L initial centroids comprises the following steps:
    randomly picking a symbol from received n input symbols as a first initial centroid and setting i=1;
    calculating distances, D(r), between each input symbol r and an initial centroid nearest to r, then, according to values of the distances, D(r), recording M symbols which have largest D(r) values, and randomly picking a next initial centroid from the M symbols with probability proportional to $D^2(r)$ and setting i=i+1;
    returning to the step of calculating distances until i=L, wherein L is an integer greater than 1; and
    obtaining L initial centroids.

6. The communication method as claimed in claim 5, wherein a value of M is set to an integer close to n/L value.

7. The communication method as claimed in claim 1, wherein the clustering algorithm is implemented by utilizing a Gaussian Mixture Model.

8. The communication method as claimed in claim 1, wherein a method utilizing the geometry configuration of the multiple levels of the superimposed signals to estimate the channel gain corresponding to each of the at least one user comprises the following steps:
    forming multiple parallelograms, wherein the multiple levels of the superimposed signals are connected into the multiple parallelograms; and
    obtaining an estimation value of a channel coefficient corresponding to each user through midpoints of edges of the multiple parallelograms.

9. The communication method as claimed in claim 8, wherein a method which obtains the estimation value of the channel coefficient corresponding to each user through midpoints of edges of the multiple parallelograms, applicable to two users and a BPSK modulation environment, comprises the following steps:
> randomly picking a first centroid, and then finding out a second centroid from three remaining centroids of four centroids, wherein the first centroid and the second centroid add up to exactly or closest to zero, and form a pair, and remaining two centroids of the four centroids form another pair; and
>
> finding out a relationship among four edges of a parallelogram by pairing the multiple centroids, wherein a centroid is randomly picked from a first pair, and two lines are respectively formed from the picked centroid to two centroids of another pair to obtain two adjacent edges of the parallelogram, and two individual midpoints on the two adjacent edges are two channel coefficients respectively corresponding to the two, or the two channel coefficients multiplied by $-1$.

10. The communication method as claimed in claim 8, wherein a method which obtains the estimation value of the channel coefficient corresponding to each user through midpoints of edges of the multiple parallelograms, applicable to three users and a BPSK modulation environment, comprises the following steps:
> pairing eight centroids with a sum of each pair including two centroids being equal to or closest to zero;
>
> forming parallelograms, wherein after pair A, B, C and D are successfully found with an arbitrary order, a total of four centroids of pair A and pair B form a parallelogram and remaining four centroids of the eight centroids form another parallelogram; then, the two closest midpoints from all the midpoints of the edges of the two parallelograms are found, then an average of the two closest midpoints represents a first channel coefficient corresponding to one of the three users, or the first channel coefficient multiplied by $-1$;
>
> picking pair A and pair C, wherein a total of four centroids of pair A and pair C form a parallelogram and remaining four centroids of the eight centroids form another parallelogram; the two closest midpoints from all the midpoints of the edges of the two parallelograms are found, then an average of the two closest midpoints represents a second channel coefficient corresponding to a second user of the three users, or the second channel coefficient multiplied by $-1$; and
>
> picking pair A and pair D, wherein a total of four centroids of pair A and pair D form a parallelogram and remaining four centroids of the eight centroids form another parallelogram; the two closest midpoints from all the midpoints of the edges of the two parallelograms are found, then an average of the two closest midpoints represents a third channel coefficient corresponding to a third user of the three users, or the third channel coefficient multiplied by $-1$.

11. The communication method as claimed in claim 1, wherein a method which obtains the estimation value of the channel gain corresponding to each of the at least one user comprises the following steps:
> introducing differential encoding in the transmission end, wherein a binary information sequence from each user is modulated by the differential encoding; and
>
> utilizing multi-level detection technique (MLDT) by a receiver in the base station to calculate a posteriori probabilities (APPs) of each level to determine a log-likelihood ratio of each bit to be input into a detector or a decoder designed for the differential encoding.

12. The communication method as claimed in claim 1, wherein a method which obtains the estimation value of the channel gain corresponding to each of the at least one user comprises the following steps:
> introducing noncoherent block coding in the transmission end, wherein a binary information sequence from each user is modulated by the noncoherent block coding; and
>
> utilizing multi-level detection technique (MLDT) in a receiver in the base station to calculate a posteriori probabilities (APPs) of each level to determine a log-likelihood ratio of each bit to be input into a decoder designed for the noncoherent block coding.

* * * * *